3,334,668
FILLER FOR CHARGING CONTAINERS
Robert J. Allen, Farmington, Mich., assignor to
Ex-Cell-O Corporation
Filed Aug. 30, 1965, Ser. No. 483,633
3 Claims. (Cl. 141—292)

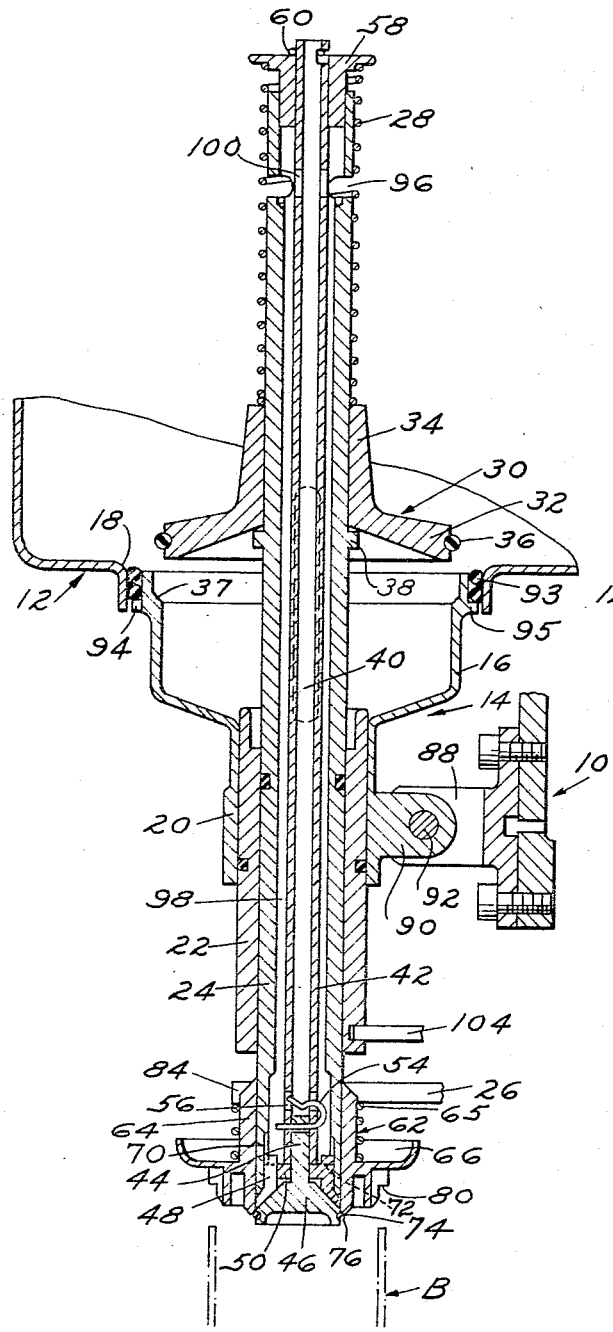
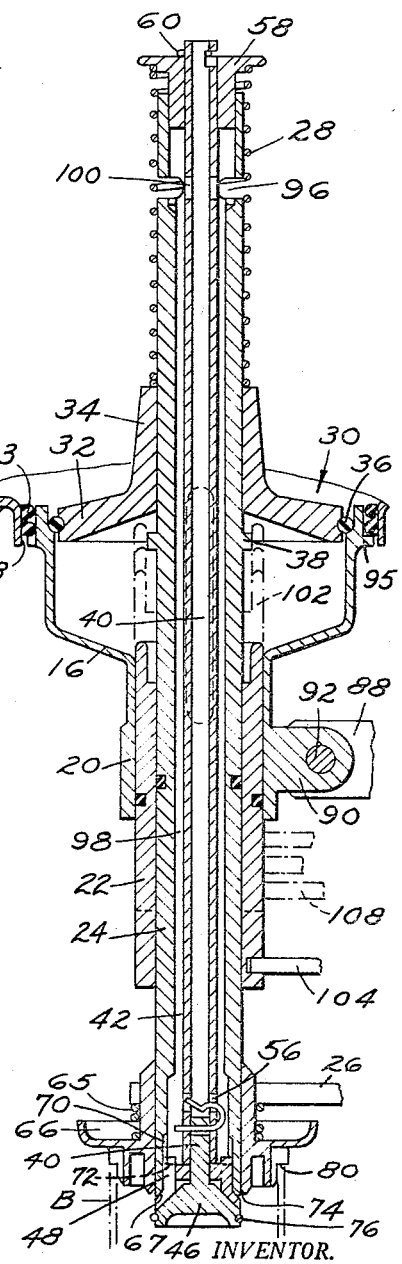

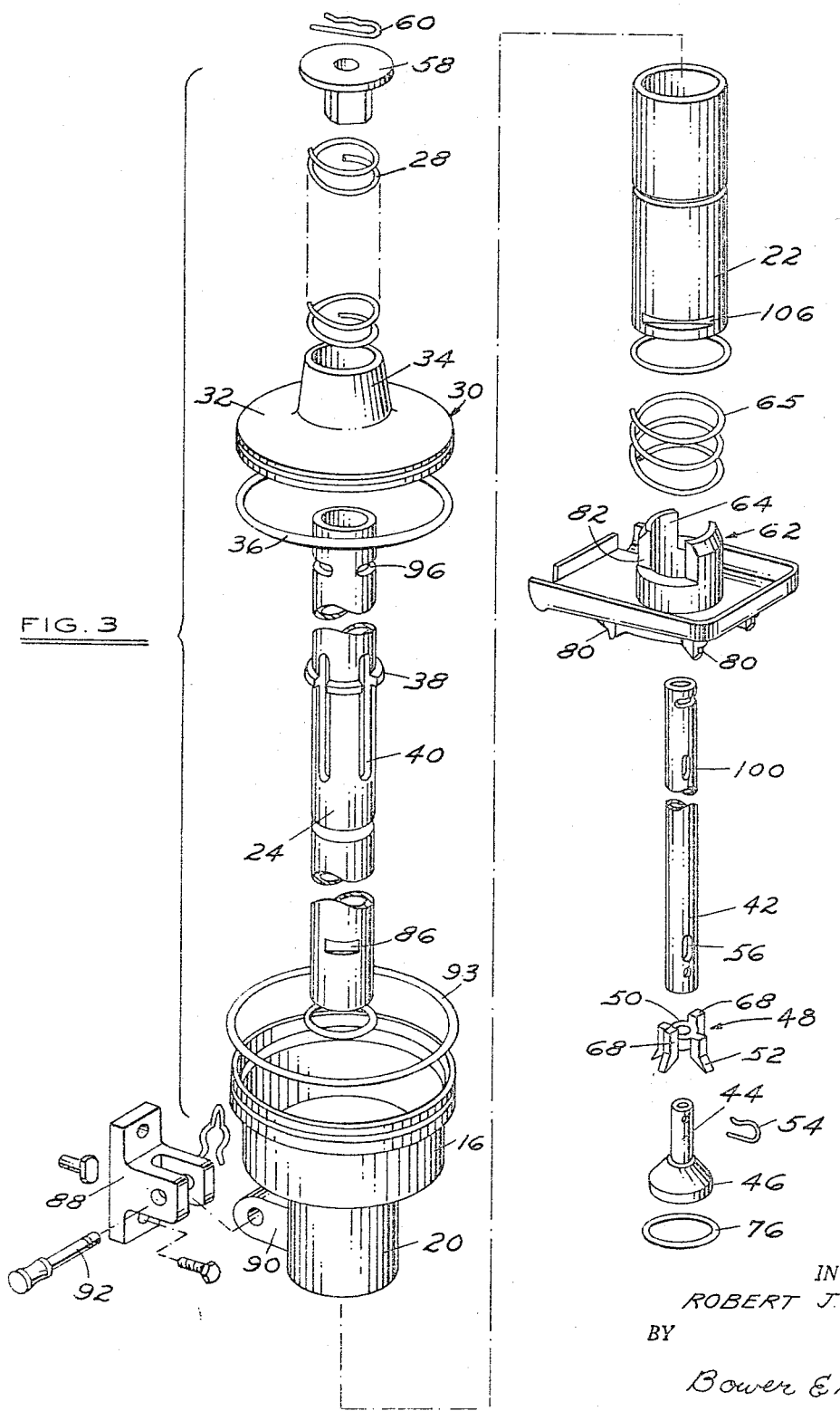

The present invention relates to fillers for charging containers of the general type disclosed in U.S. Patent No. 3,002,540, issued Oct. 3, 1961, on the application of Charles Z. Monroe and Harry B. Egleston. More specifically, the invention is concerned with an improved filler head that can be readily adjusted to fill containers of various sizes, as for example one-half pint, one-third quart, one pint and full quart, without requiring a change of parts.

In milk filling machines it is desirable to allow for adjusting the filler heads to permit variations in the volume of milk dispensed to charge containers of different sizes. It has been found that filler heads of this type present an increased problem of foaming because of the enlarged internal volume necessitated to accommodate containers having various capacities.

An object of the present invention is the provision of a milk filler head which greatly reduces the tendency toward foaming.

Another object is to provide a milk filler head that can be easily and rapidly disassembled.

A further object of the invention is the provision of a filler head that can be adjusted to fill containers of various sizes with a minimum of foaming produced by air entrapment within the filler head.

The foregoing, and other objects, will become apparent as the following description proceeds, taken together with the accompanying drawings, wherein:

FIG. 1 is a sectional view of the filling head portion of a milk filling machine embodying the principles of the instant invention, the view showing the filling head valve mechanism in shutoff position.

FIG. 2 is a sectional view similar to FIG. 1 showing the valve in open position.

FIG. 3 is an exploded view of various separable portions of the filler head mechanism.

Referring to FIG. 1, the drawings illustrate a filling head which is mounted in a milk filling machine of the type generally disclosed in U.S. Patent 3,002,540. In such machine, the milk, or similar product, is filled into milk cartons B of the type disclosed in U.S. Patent 3,120,335, issued February 4, 1964. These patents are assigned to the assignees of the subject application and disclosures thereof are incorporated by reference for a more complete description of the filling machine and container.

The filling machine is preferably of the rotary type having an upstanding column, a fragment of which is indicated at 10, which carries a supply tank 12 at the upper end. The tank 12 is adapted to hold a relatively large amount of milk or other fluid to be packaged in the containers B. Mounted within the supply tank 12 and projecting downwardly therefrom are one or more filler heads 14 which are designed for one-stage filling. That is, each filler head 14 is designed to supply a full charge for the containers B which are supplied in various sizes, such as one-half pint, one-third quart, one pint, and one quart.

As shown in FIGS. 1 and 2, each filler head 14 comprises a fixed cylinder 16 detachably and sealingly mounted in the aperture 18 in the bottom of the tank 12. Adjustably and sealingly mounted within the depending nozzle portion 20 of the fixed cylinder 16 is a calibration bushing 22. Slidably and sealingly mounted within the calibration bushing is an operating sleeve 24 adapted to be reciprocated vertically by means of a forked arm 26. The arm 26 can be reciprocally driven by various means, such as disclosed in previously referred to U.S. Patent 3,002,540, the details of which are not of concern here.

Telescopically mounted on the upper end of the operating sleeve 24 and resiliently biased downwardly with respect thereto by means of spring 28, is a displacement cylinder 30 which has a sloping plate portion 32 and a slide portion 34. Around the periphery of the plate 32 there is an O-ring 36 adapting the displacement cylinder to sealingly engage the inner peripheral tapered wall 37 of the fixed cylinder 16. Within the interior of the displacement cylinder 30, the operating sleeve 24 is provided with a lateral enlargement or shoulder 38 intermediate the ends of the sleeve 24 as seen in the exploded view of FIG. 3. The shoulder 38 is adapted to engage the under surface of the plate 32 during the fully raised position. The operating sleeve is also provided with longitudinal filling slots 40 (FIG. 3) providing communication between the interior of the operating sleeve and the interior of the fixed cylinder 16.

Concentrically mounted within the operating sleeve 24 and rigidly fixed for limited axial movement with respect thereto is an exhaust tube 42. The latter is telescopically fitted over the upper stem portion 44 of dispensing valve seat 46. The spray separator 48 is slidably mounted on the stem 44 by means of collar 50, while the radial separator elements 52, spaced approximately 90° from each other, engage the conical surface portion of the valve seat. The straight leg of retaining hair pin 54 extends through aligned holes in stem 44 and tube 42, while the bowed leg is positioned in the lower vents 56 of the tube.

The upper end of the exhaust tube 42 is held in place by means of spray retainer collar 58 partially nested within the upper end of the operating sleeve 24. A retainer clip 60 attached to the upper end of the exhaust tube 42 prevents the spring retainer collar 58 from slipping off the tube. Spring 28, compressed between the retainer collar 58 and the upper end of the displacement cylinder slide portion 34, provides sealing pressure for the latter and also helps maintain the exhaust tube 42 in position within the operating sleeve 24.

The container actuated valve closing assembly 62 comprises a valve bushing 64 slidably mounted on the lower end of the operating sleeve 24. Valve spring 65 surrounds the valve bushing 64 and is compressed between the drip pan 66 and the arm 26. The valve seat 46 is maintained in predetermined spaced relation with the internally tapered lower end portion 67 of the operating sleeve 24 by the radial elements 52 so as to define an annular orifice of appropriate size for the viscosity of the fluid to be dispensed. The pair of upstanding lugs 68 are provided to be splined into recessed grooves 70 on the inside of the operating tube 24. The size of the dispensing orifice may, accordingly, be altered by manually pulling down on the valve seat 46, and allowing the lugs 68 to drop out of engagement with grooves 70. The spray separator assembly 48 is thereupon rotated a sufficient amount so that upon release of the valve seat the upper edges of the lugs 68 will engage the stop shoulder 72. It can thus be seen that the size of the dispensing orifice can be increased by an amount equal to the height of the lugs 68 above the collar 50.

The valve bushing 64 is formed with a tapered seat 74 at its lower end and which is adapted to sealingly engage a resilient O-ring 76 carried by the valve seat 46. Engagement between the seat 74 and O-ring 76 by virtue of spring 65 forcing bushing 64 down, effectively closes the dispensing orifice.

For the purpose of opening the dispensing valve upon descent of the operation sleeve 24 into filling position over a container B, provision is made for raising valve actuating bushing 64 as an incident to such motion. As previously mentioned, bushing 64 is provided with an integral rectangular drip pan 66 having integral container stops 80 engage the leading and trailing top edges of the container B, as shown, for example, in Fig. 6 of U.S. Patent 3,002,540, sliding the bushing 64 upwardly relative to the sleeve 24, compressing spring 65 and opening the dispensing orifice (FIG. 2). In order to maintain the stops 80 in the proper position and prevent rotational movement of the bushing 64 on the sleeve 24, the upper portion of the bushing 64 is cut away at 82 so that it will achieve a sliding fit between the prongs 84 of the forked drive arm 26 which operates the sleeve 24. As seen in FIG. 3, the prongs 84 positively engage the sleeve 24 by fitting in the opposed notches 86.

The filler 14 is removably attached to the machine filler assembly by means of a clevis type bracket 88 which is bolted to the column member 10. Tongue member 90 integral with the nozzle 20 is retained in bracket 88 by the single pin 92. The cylinder 16 is retained in aperture 18 by means of O-ring 93. It will thus be seen that the filler 14 can be disassembled from the machine by the removal of the single pin 92 and O-ring 93. In order to facilitate the removal of O-ring 93, access notch 94 is positioned in flange 95 to allow for the use of a rod to be inserted for dislodging ring 93.

The operation of the filler 14 may be followed by starting with the head in the condition illustrated in FIG. 1. At this time, the displacement cylinder 30 and operating sleeve 24 are in their fully raised position, permitting fluid such as milk from the tank 12 to flow freely into chamber 16. As a result, part of the air in the filler will escape up through the sleeve 24 and out the metering duct 96.

The milk will pass from chamber 16 through slots 40 into the passage 98, formed between the interior of sleeve 24 and the exterior of tube 42. As the fluid moves down the passage 98, it forces the air below slots 40 down the passage 98 thereby tending to trap the air in the lower end of the filler. As the weight of the milk in the column increases, the air is compressed and seeks an exit. By virtue of positioning the vents 56 adjacent the lower extremity of tube 42 the air will escape through the vents 56. This will permit the milk to rush into the filler forcing the air out in such a way that the air will not have to pass through the milk to exhaust.

The air rises up through the tube 42 and exhausts at the outlets 100 which are aligned with the metering ducts 96. The arrangement results in almost 100 percent of the air exhausting without having to pass through the milk, and thus greatly reducing the foam problem within the filler.

As the forked drive plate 26 moves the operating sleeve 24 downwardly, the displacement cylinder 32, due to the biasing effect of spring 28, will also move downwardly until the seal 36 engages the open upper end of the fixed cylinder 16. This pressurizes the fluid trapped in the chamber 16, the passage 98 and the tube 42, causing the excess fluid to surge upwardly and out through the overflow vents 96 in the operating sleeve 24 and outlets 100 in the tube 42.

As the operating sleeve 24 descends further, the displacement cylinder 32 seats firmly within the fixed chamber 16, but the sleeve continues to descend. The shoulder 38 thereupon separates from the inner wall of the plate 32, and provided there is a container in the station underlying the filler head 14, the leading and trailing opposed edges of the container B will engage the container top stops 80. Such action raises the bushing 64, opening the dispensing valve orifice as shown in FIG. 2 and permitting a measured quantity of fluid from the interior of the filler head 14 to be discharged into the underlying container. The air displaced by the incoming fluid is discharged around the perimeter of the container between the radiating stops 80, spaced approximately 90° from each other.

After the contents of the filler head 14 have been discharged, the operating sleeve 24 is driven upwardly by the forked drive arm 26. As an incident to this upward travel, the valve actuating bushing 64 descends under force of spring 65 and closes the discharge orifice. The shoulder 38 of the operating sleeve 24 moves upwardly into contact with the plate 32, lifting the same and restoring the parts of the filler head to the position indicated in FIG. 1 for the start of another cycle.

For the purpose of adjusting the filler heads for providing fills of various sizes, such as half-pints, third-pints, pint and quart, the calibration bushing 22 may be adjusted to the positions indicated by the phantom lines 102 in FIG. 2. This is accomplished in the present instance by means of a second forked arm 104, engaging grooves 106 in member 22, adapted to move vertically to the position indicated by the phantom lines 108 in FIG. 2. By damming off portions of the milk chamber 16, the filler can be adjusted for the various fills without affecting the exhaust tube feature that allows air within the filler to exit without passing through the milk.

It should be understood, of course, that the foregoing disclosure relates to only a preferred embodiment of the invention and that it is intended to cover all changes and modifications of the example of the invention herein chosen for the purposes of the disclosure, which do not constitute departures from the spirit and scope of the invention.

I claim the following:

1. In a filler unit for a container filling machine comprising, a supply tank, a fixed cylinder sealingly mounted in an aperture in the bottom of said supply tank, a displacement cylinder adapted to telescope within said fixed cylinder and to trap fluid within said cylinders, an operating sleeve having a lateral enlargement intermediate the ends thereof, said operating sleeve being slidably mounted within said cylinders for upward and downward movement therein, means for moving said operating sleeve upwardly and downwardly within said cylinders, upward movement of said operating sleeve lifting said displacement cylinder through engagement of the same by said lateral enlargement, means for effecting downward movement of said displacement cylinder upon downward movement of said operating sleeve, and a dispensing valve at the lower end of said operating sleeve, means defining communication between the interior of said operating sleeve and said cylinders, means defining at least one metering vent in that portion of said operating sleeve outside said cylinders but within said supply tank, the improvement in said filler unit comprising: an air exhaust tube concentrically housed within said operating sleeve and sealably connected at its lower end to the valve seat portion of said dispensing valve for exhausting air within said filler unit; means defining communication between the interior of said operating sleeve and the interior of said tube located adjacent the lower extremity of said tube; and means defining at least one metering vent in said tube positioned in vertical alignment with said operating sleeve metering vent.

2. A filler unit in accordance with claim 1 in which said valve seat has a valve stem portion mounted in the lower end of said tube and connected thereto by spring clip means for movement therewith.

3. A filler unit in accordance with claim 2 in which said last mentioned communication means comprises aligned slots positioned immediately above said valve stem for unrestrained insertion of one leg of said spring clip.

References Cited

UNITED STATES PATENTS

| | | | |
|---|---|---|---|
| 2,620,113 | 12/1952 | Bodendoerfer et al. | 222—442 X |
| 2,725,170 | 11/1955 | Day et al. | 141—310 X |
| 3,002,540 | 10/1961 | Monroe et al. | 141—308 |

FOREIGN PATENTS 53,658  5/1912  Austria.

LAVERNE D. GEIGER, *Primary Examiner.*

E. J. EARLS, *Assistant Examiner.*